Patented Aug. 19, 1924.

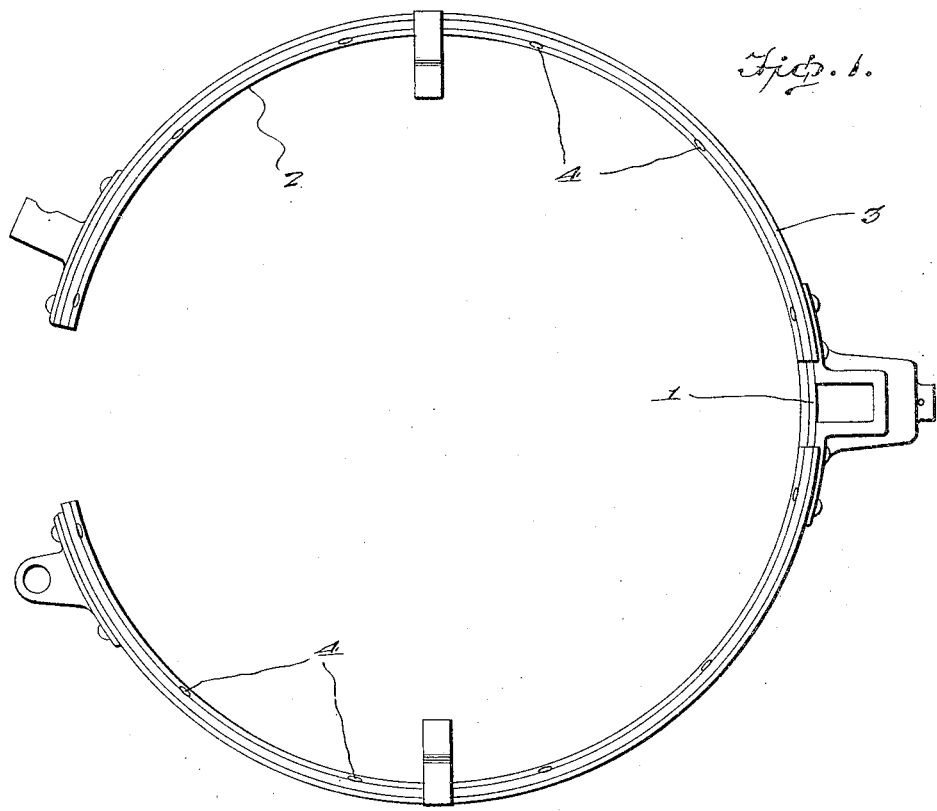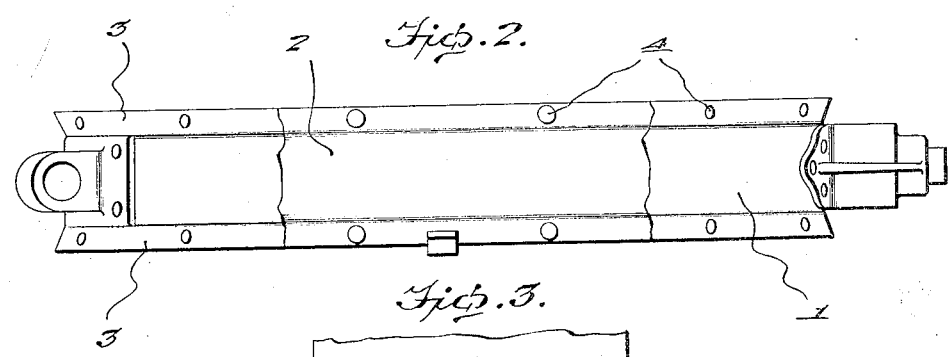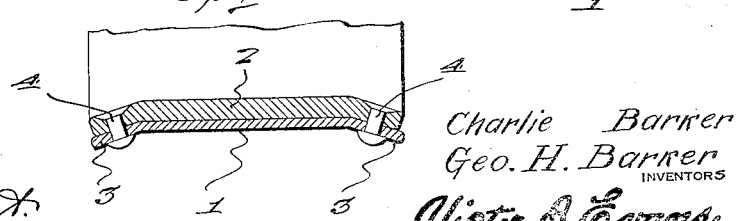

1,505,847

UNITED STATES PATENT OFFICE.

CHARLIE BARKER AND GEORGE H. BARKER, OF TERRE HAUTE, INDIANA.

BRAKE BAND.

Application filed July 13, 1922. Serial No. 574,723.

*To all whom it may concern:*

Be it known that we, CHARLIE BARKER and GEORGE H. BARKER, citizens of the United States, residing at Terre Haute, in the county of Vigo and State of Indiana, have invented new and useful Improvements in Brake Bands, of which the following is a specification.

This invention relates to improvements in brake bands for motor vehicles and the like, the general object of the invention being to provide means for connecting the lining with the band in such a manner that the maximum amount of use can be secured from the lining before the same must be discarded.

Another object of the invention is to provide offset parts on the band for holding the rivets which secure the lining thereto so that said rivets will not come in contact with the drum, thereby enabling the maximum braking usage to be obtained from the lining and eliminating scoring or mutilating of the brake drum which is now a constant source of trouble.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of a brake band supplied with my invention.

Figure 2 is a plan view with parts broken away.

Figure 3 is a transverse sectional view.

In these views 1 indicates the brake band and 2 the lining thereof. It is customary to fasten the lining to the band by rivets which have their heads pressed into the lining so that they cannot touch the drum until the lining has become worn but as it is impossible to press the rivets very far into the lining, only a slight wear of the lining will bring the rivet heads into engagement with the drum. This will seriously interfere with the gripping effect of the lining on the drum and it will also score the drum and make the application of the brakes very noisy.

In carrying out the invention we offset the sides of the band to provide the flanges 3, and place the rivet holes in these flanges so that the rivets 4 have their heads removed from the active or braking surface of the lining so that as the lining wears the rivets will not engage the drum.

This arrangement of parts will give the brake lining long life and the entire inner surface of the main part of the lining is uninterrupted by rivet heads so that the maximum amount of braking surface is secured.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. A brake band having laterally extending flanges disposed out of the plane of the band proper and to which the brake lining is adapted to be attached.

2. A brake band of the class described having its edges bent at an angle to provide flanges, a brake lining having portions extending over said flanges and rivets passing through the flanges and the lining.

In testimony whereof we affix our signatures.

CHARLIE BARKER.
GEORGE H. BARKER.